(12) United States Patent
Gunther et al.

(10) Patent No.: US 8,856,568 B2
(45) Date of Patent: *Oct. 7, 2014

(54) INDEPENDENT POWER CONTROL OF PROCESSING CORES

(75) Inventors: Stephen H. Gunther, Beaverton, OR (US); Edward A. Burton, Portland, OR (US); Anant Deval, Beaverton, OR (US); Stephan Jourdan, Portland, OR (US); Robert Greiner, Beaverton, OR (US); Michael Cornaby, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/486,948

(22) Filed: Jun. 1, 2012

(65) Prior Publication Data

US 2012/0239946 A1 Sep. 20, 2012

Related U.S. Application Data (63) Continuation of application No. 13/471,222, filed on May 14, 2012, which is a continuation of application No. 13/087,073, filed on Apr. 14, 2011, which is a continuation of application No. 11/555,609, filed on Nov. 1, 2006, now Pat. No. 7,949,887.

(51) Int. Cl.
*G06F 1/26* (2006.01)
*G06F 1/32* (2006.01)

(52) U.S. Cl.
CPC .................................. *G06F 1/3203* (2013.01)
USPC ........... 713/320; 713/300; 713/310; 713/322; 713/323

(58) Field of Classification Search
USPC .................................. 713/300, 310, 320, 322
See application file for complete search history.

(56) References Cited

U.S. PATENT DOCUMENTS

| | | |
|---|---|---|
| 4,588,903 A | 5/1986 | Johnson |
| 4,893,227 A | 1/1990 | Gallios et al. |
| 5,392,437 A | 2/1995 | Matter et al. |
| 5,502,838 A | 3/1996 | Kikinis |
| 5,913,068 A | 6/1999 | Matoba |
| 6,141,762 A | 10/2000 | Nicol et al. |

(Continued)

FOREIGN PATENT DOCUMENTS

| | | |
|---|---|---|
| CN | 1641534 | 7/2005 |
| EP | 1376692 A2 | 1/2004 |

(Continued)

OTHER PUBLICATIONS

Office Action for German Patent Application No. 102007051841.4, Mailed Feb. 11, 2011, 5 Pages.

(Continued)

*Primary Examiner* — Kim Huynh
*Assistant Examiner* — Zahid Choudhury
(74) *Attorney, Agent, or Firm* — Trop, Pruner & Hu, P.C.

(57) ABSTRACT

Independent power control of two or more processing cores. More particularly, at least one embodiment of the invention pertains to a technique to place at least one processing core in a power state without coordinating with the power state of one or more other processing cores.

29 Claims, 5 Drawing Sheets

(56) References Cited

U.S. PATENT DOCUMENTS

| | | | |
|---|---|---|---|
| 6,150,724 A | 11/2000 | Wenzel et al. |
| 6,424,128 B1 | 7/2002 | Hiraki et al. |
| 6,452,247 B1 | 9/2002 | Gardner |
| 6,577,535 B2 | 6/2003 | Pasternak |
| 6,600,296 B2 | 7/2003 | Hazucha |
| 6,625,740 B1 | 9/2003 | Datar et al. |
| 6,693,412 B2 | 2/2004 | Ruan et al. |
| 6,727,118 B2 | 4/2004 | Lasky et al. |
| 6,754,086 B2 | 6/2004 | Harris et al. |
| 6,788,035 B2 | 9/2004 | Bassett et al. |
| 6,802,014 B1 | 10/2004 | Suurballe |
| 6,803,805 B2 | 10/2004 | Wang et al. |
| 6,804,632 B2 | 10/2004 | Orenstien et al. |
| 6,812,565 B2 | 11/2004 | Nishimoto et al. |
| 6,864,600 B2 | 3/2005 | Malinovitch |
| 6,867,502 B2 | 3/2005 | Katagiri et al. |
| 6,873,136 B2 | 3/2005 | Chagny |
| 6,895,520 B1 | 5/2005 | Altmejd et al. |
| 6,940,163 B2 | 9/2005 | Piorun et al. |
| 6,983,389 B1 | 1/2006 | Filippo |
| 7,026,797 B2 | 4/2006 | McCune et al. |
| 7,032,117 B2 | 4/2006 | Kolinummi et al. |
| 7,034,344 B2 | 4/2006 | Pavier et al. |
| 7,051,306 B2 | 5/2006 | Hoberman et al. |
| 7,062,933 B2 | 6/2006 | Burns et al. |
| 7,110,266 B1 | 9/2006 | Porter et al. |
| 7,126,798 B1 | 10/2006 | Piorun et al. |
| 7,178,044 B2 | 2/2007 | Pappalardo et al. |
| 7,181,631 B2 | 2/2007 | Volk |
| 7,202,648 B2 | 4/2007 | Gardner et al. |
| 7,206,954 B2 | 4/2007 | Syed et al. |
| 7,218,085 B2 | 5/2007 | Abedinpour et al. |
| 7,263,457 B2 | 8/2007 | White et al. |
| 7,275,164 B2 | 9/2007 | Hottelet et al. |
| 7,284,137 B2 | 10/2007 | Clark et al. |
| 7,313,706 B2 | 12/2007 | Williams et al. |
| 7,337,334 B2 | 2/2008 | Kuhlmann et al. |
| 7,363,522 B2 | 4/2008 | Prosperi |
| 7,366,926 B2 | 4/2008 | Si et al. |
| 7,383,449 B2 | 6/2008 | Nokkonen |
| 7,395,440 B2 | 7/2008 | Nokkonen |
| 7,482,792 B2 | 1/2009 | Burton et al. |
| 7,523,336 B2 | 4/2009 | Grasso et al. |
| 7,536,597 B2 | 5/2009 | McGowan |
| 7,555,664 B2 | 6/2009 | Sullam |
| 7,568,115 B2 | 7/2009 | Borkar et al. |
| 7,598,630 B2 | 10/2009 | Burton |
| 7,600,145 B2 | 10/2009 | Vera et al. |
| 7,647,452 B1 | 1/2010 | Moll et al. |
| 7,664,971 B2* | 2/2010 | Oh .................. 713/300 |
| 7,681,054 B2 | 3/2010 | Ghiasi et al. |
| 7,685,445 B2 | 3/2010 | Arabi et al. |
| 7,698,576 B2 | 4/2010 | Narendra et al. |
| 8,037,445 B2 | 10/2011 | Poirier et al. |
| 8,044,697 B2 | 10/2011 | Arabi et al. |
| 2002/0109413 A1 | 8/2002 | Malinovitch |
| 2002/0152407 A1 | 10/2002 | Alia et al. |
| 2002/0184547 A1 | 12/2002 | Francis et al. |
| 2003/0065960 A1* | 4/2003 | Rusu et al. .................. 713/300 |
| 2003/0122429 A1 | 7/2003 | Zhang et al. |
| 2003/0126477 A1 | 7/2003 | Zhang et al. |
| 2003/0131268 A1 | 7/2003 | Kolinummi et al. |
| 2003/0135768 A1 | 7/2003 | Knee et al. |
| 2003/0210274 A1 | 11/2003 | Subramanian et al. |
| 2004/0019814 A1 | 1/2004 | Pappalardo et al. |
| 2004/0117678 A1 | 6/2004 | Soltis, Jr. et al. |
| 2004/0158750 A1 | 8/2004 | Syed et al. |
| 2005/0040810 A1 | 2/2005 | Poirier et al. |
| 2005/0046400 A1 | 3/2005 | Rotem |
| 2005/0154931 A1 | 7/2005 | Oh |
| 2005/0162188 A1 | 7/2005 | Newman |
| 2005/0210905 A1 | 9/2005 | Burns et al. |
| 2005/0223251 A1 | 10/2005 | Liepe et al. |
| 2005/0289365 A1 | 12/2005 | Bhandarkar |
| 2005/0289367 A1 | 12/2005 | Clark et al. |
| 2006/0006432 A1 | 1/2006 | Shiraishi et al. |
| 2006/0020838 A1* | 1/2006 | Tschanz et al. ............. 713/322 |
| 2006/0053326 A1 | 3/2006 | Naveh et al. |
| 2006/0085660 A1 | 4/2006 | Zagacki |
| 2006/0117192 A1 | 6/2006 | Nokkonen |
| 2006/0149974 A1 | 7/2006 | Rotem et al. |
| 2006/0174149 A1 | 8/2006 | Hottelet et al. |
| 2006/0218424 A1 | 9/2006 | Abramovici et al. |
| 2006/0282692 A1 | 12/2006 | Oh |
| 2006/0288246 A1 | 12/2006 | Huynh |
| 2007/0023878 A1 | 2/2007 | Burton |
| 2007/0033425 A1 | 2/2007 | Clark |
| 2007/0043964 A1 | 2/2007 | Lim et al. |
| 2007/0192638 A1 | 8/2007 | Grasso et al. |
| 2007/0198863 A1 | 8/2007 | Bose et al. |
| 2007/0271473 A1 | 11/2007 | Hosomi |
| 2008/0028236 A1 | 1/2008 | Capps et al. |
| 2008/0028244 A1 | 1/2008 | Capps et al. |
| 2008/0082839 A1 | 4/2008 | Dibene et al. |
| 2008/0104425 A1 | 5/2008 | Gunther et al. |
| 2008/0136397 A1 | 6/2008 | Gunther et al. |
| 2008/0229128 A1 | 9/2008 | Heller et al. |
| 2009/0099705 A1 | 4/2009 | Harris |
| 2009/0313489 A1 | 12/2009 | Gunther et al. |
| 2010/0011233 A1 | 1/2010 | Halepete et al. |
| 2011/0296208 A1 | 12/2011 | Koniaris et al. |

FOREIGN PATENT DOCUMENTS

| | | |
|---|---|---|
| EP | 1555595 | 7/2005 |
| EP | 1736851 | 12/2006 |
| GB | 2444697 | 6/2008 |
| JP | S64-48119 | 2/1989 |
| JP | 10222256 | 8/1998 |
| JP | 2006293768 | 10/2006 |
| JP | 2008117397 | 5/2008 |
| KR | 20050073976 | 7/2005 |
| KR | 200573976 | 2/2007 |
| WO | 20011003279 A1 | 1/2001 |
| WO | 2003027820 | 4/2003 |
| WO | 20031100831 A2 | 12/2003 |
| WO | 20041102623 A2 | 11/2004 |
| WO | 20051038920 A2 | 4/2005 |
| WO | 2006019973 | 2/2006 |
| WO | WO-2006019973 | 2/2006 |
| WO | 2007019003 | 2/2007 |
| WO | 2007038529 | 4/2007 |
| WO | 2007081466 | 7/2007 |

OTHER PUBLICATIONS

Office Action from Japanese Patent Application No. 2007-281947 mailed Dec. 15, 2009, 3 Pages.

Office Action for United Kingdom Application No. 0721314.3 mailed Apr. 7, 2008, 8 Pages.

Office Action for United Kingdom Application No. 0721314.3 mailed Apr. 14, 2010, 3 Pages.

Office Action for Chinese Application No. 200710165766.5 mailed Mar. 10, 2010, 41 Pages.

Office Action for Korean Application No. 10-2007-111212 mailed Jul. 31, 2009, 9 Pages.

Final Office Action for Korean Application No. 10-2007-111212 mailed Feb. 11, 2010, 3 Pages.

Notice of Allowance for U.S. Appl. No. 11/555,609 mailed Mar. 14, 2011, 6 Pages.

Notice of Allowance for U.S. Appl. No. 11/555,609 mailed Jan. 12, 2011, 12 Pages.

Non-Final Office Action for U.S. Appl. No. 11/555,609 mailed Jul. 10, 2009, 13 Pages.

Final Office Action for U.S. Appl. No. 11/555,609 mailed Jun. 24, 2010, 19 Pages.

Non-Final Office Action for U.S. Appl. No. 12/545,657 mailed Jan. 3, 2011, 15 Pages.

Office Action for Chinese Application No. 200710165766.5 mailed Jun. 15, 2011, 9 Pages.

Office Action from Japanese Patent Application No. 2007-281947 mailed Jul. 12, 2011, 6 Pages.

(56) References Cited

OTHER PUBLICATIONS

Notice of Allowance for U.S. Appl. No. 12/545,657, Mailed Jul. 21, 2011, 12 Pages.
Office Action for German Patent Application No. 102007051841.4, Mailed Mar. 13, 2012, 4 Pages.
Non-Final Office Action for U.S. Appl. No. 12/899,311 Mailed Apr. 17, 2012, 17 Pages.
Office Action for United Kingdom Application No. 0721314.3 Mailed Jun. 23, 2009, 5 Pages.
Non-Final Office Action for U.S. Appl. No. 13/087,073 Mailed May 17, 2012, 17 Pages.
Examination Report for United Kingdom Application No. GB0721314.3, Mailed Apr. 14, 2010, 3 Pages.
Non-Final Office Action for Chinese Application No. 200710165766.5, Mailed Mar. 10, 2010, 41 Pages.
Non-Final Office Action for Korean Patent Application No. 10-2007/111212, Mailed Jul. 31, 2009, 9 Pages.
Non Final Office Action for U.S. Appl. No. 13/471,222, mailed Aug. 23, 2012, 16 pages.
Final Office Action for U.S. Appl. No. 13/471,222, mailed Dec. 21, 2012, 12 pages.
Final Office Action for U.S. Appl. No. 13/087,073, mailed Oct. 9, 2012, 14 pages.
Final Office Action for U.S. Appl. No. 12/899,311, mailed Sep. 20, 2012, 11 pages.
Abedinpour et al., "DC-DC Power Converter for Monolithic Implementation", vol. 4, Conference Record of the IEEE Industry Applications Conference, Rome, Italy, Oct. 2000, pp. 2471-2475.
Carley et al., "A Completely On-Chip Voltage Regulation Technique for Low Power Digital Circuits", Proceedings of 1999 International Symposium on Low Power Electronics and Design, 1999, pp. 109-111.
Kim, Jaeha, "Adaptive Supply Serial Links with Sub-1-V Operation and Per-Pin Clock Recovery", IEEE Journal of Solid-State Circuits, vol. 37, No. 11, Nov. 2002, pp. 1403-1413.
Abedinpour et al., "Monolithic Distributed Power Supply for a Mixes-Signal Integrated Circuit", vol. 3, Proceedings of the International Symposium on Circuits and Systems, IEEE, May 25-28, 2003, pp. 111-308-111-311.
Hazucha et al., "A 233MHz, 80-87% efficient, integrated, 4-phase DC-DC converter in 90nm CMOS", 2004 Symposium on VLSI Circuits Digest Technical Papers, Jun. 17-19, 2004, pp. 256-257.
Yasuko Sugifuji, Notification of Reasons for Refusal, Japanese Patent Application No. 2007-281947, 3 pages, Japan Patent Office, Examination Report for United Kingdom Application No. GB0721314.3, mailed Apr. 14, 2010.
Nikki Dowell, Examination Report, Application No. GB0721314.3, Jun. 23, 2009, 4 pages, UK Intellectual Property Office.
Mark Edwards, Search Report, Application No. GB0721314.3, Apr. 4, 2008, 3 pages, UK Intellectual Property Office.
Non Final Office Action for U.S. Appl. No. 12/899,311, mailed Oct. 24, 2013, 14 pages.
Non Final Office Action for U.S. Appl. No. 13/471,222, mailed Aug. 22, 2013, 10 pages.
Office Action for foreign counterpart Japanese Application No. 2007-281947 mailed May 22, 2013, 14 pages. (English Translation included).
Non Final Office Action for U.S. Appl. No. 13/087,073, mailed Nov. 14, 2013, 16 pages.

* cited by examiner

FIG. 6 ously, the additional circuitry needed to coordinate a power state change of a processing core with one or more other processing cores may cause the processor or system to draw more power, thereby at least partially offsetting the power consumption reduction of reducing a power state change intended to conserve power.

INDEPENDENT POWER CONTROL OF PROCESSING CORES

PRIORITY

This application is a continuation of application Ser. No. 13/471,222, filed on May 14, 2012, entitled "Independent power control of processing cores," which is a continuation of application Ser. No. 13/087,073, filed on Apr. 14, 2011, entitled "Independent power control of processing cores," which is a continuation of application Ser. No. 11/555,609, filed on Nov. 1, 2006, and issued on May 24, 2011 as U.S. Pat. No. 7,949,887, entitled "Independent power control of processing cores," and assigned to the corporate assignee of the present invention and incorporated herein by reference.

BACKGROUND

1. Field

The present disclosure pertains to the field of computing and computer systems, and, more specifically, to the field of power control of microprocessors.

2. Background

Some computing systems and microprocessors may contain multiple processing elements, or "cores", to execute instructions of a program and perform some function in response thereto. For example, multiple processing cores may exist on the same processor die. Alternatively or conjunctively, some computer systems may include multiple processors, each having one or more processing cores. Moreover, some computing systems and microprocessors may be able to control power consumption of one or more processing cores by placing the cores in various power states, which may be defined according to a power specification, such as ACPI (defined) or some other specification.

However, processing systems and microprocessors may not be able to control the power states of each processing core independently, but must coordinate a power state changes among the various cores present in the system or processor by using such techniques as polling the power state of other processing cores or otherwise detecting the power state of other cores in some way. Accordingly, the power states of a processing core may be dependent upon at least one other processing core in a computing system or processor.

Because some processing systems or processors may rely on the processing states of one or more cores to control the processing state of a particular core, the system or processor may require additional control circuitry to change a core's power state. Furthermore, polling or otherwise detecting power states of other processing cores before being able to change the power state of a particular processing core may require additional time before the core's processor state may be changed, which can degrade processing performance. Ironically, the additional circuitry needed to coordinate a power state change of a processing core with one or more other processing cores may cause the processor or system to draw more power, thereby at least partially offsetting the power consumption reduction of reducing a power state change intended to conserve power.

BRIEF DESCRIPTION OF THE FIGURES

The present invention is illustrated by way of example and not limitation in the accompanying figures.

DETAILED DESCRIPTION

Embodiments of the invention relate to computer systems. More particularly, some embodiments of the invention relate to a technique to control power consumption of two or more processing cores or portions of cores independently of each other. At least one embodiment of the invention enables at least one processing core to enter a number of power states without consideration to the power state at least one other processing core within the same processor or computing system. At least one embodiment, enables independent power control of circuits or functional blocks within one or more cores.

At least one embodiment of the invention may control power consumption of one or more cores by adjusting one or more clocks and/or operating voltages used by the core. For example, one embodiment may use control logic to enable or disable, voltage transformers, charge pumps, or some other voltage altering mechanism to control the voltage to one or more portions of a processor or processing core. Alternatively or conjunctively, one embodiment may use control logic to enable or disable one or more phase lock loops (PLLs), clock dividers, or some other clock gating mechanism to control the frequency, phase, duration, etc., of one or more clock signals used to operate one or more portions of a processor or processing core.

Moreover, power consumption of processing components, such as a processor or core, may be controlled according to a specification, so that an operating system or other software or hardware may place the component into one or more power states, such that the difference, ratio, or range of power consumption change may be known in relation to other power consumption states. One such specification is the ACPI power specification, which, among other things, may define a number of component power states (or "c states") according to a range by which power consumed by the component is to change in relation to the other component power states by placing the component in a particular power state. A component, such as a processing core, may be capable of supporting several ranges of power consumption defined by a specification by adjusting the clocks, operating voltage, or both.

In the case of ACPI, for example, a processing core, according to one embodiment, may support the ability to enter a "c3" state, in which the operating voltage of a core or processor is reduced to the minimum level required to retain state, rather than change output data, while the operating voltage. In other embodiments, other power states may be supported by a processor and/or core, either included in the ACPI specification or in some other specification.

At least one embodiment of the invention may place a processor or processing core into a particular power state (defined by ACPI or otherwise) without regard to and without first coordinating with another processor or core within the same system or die. Advantageously, embodiments of the invention may enjoy greater power control flexibility, while reducing the time and/or logic necessary to change a processor or core power state, than in some of the prior art.

Figure 1:
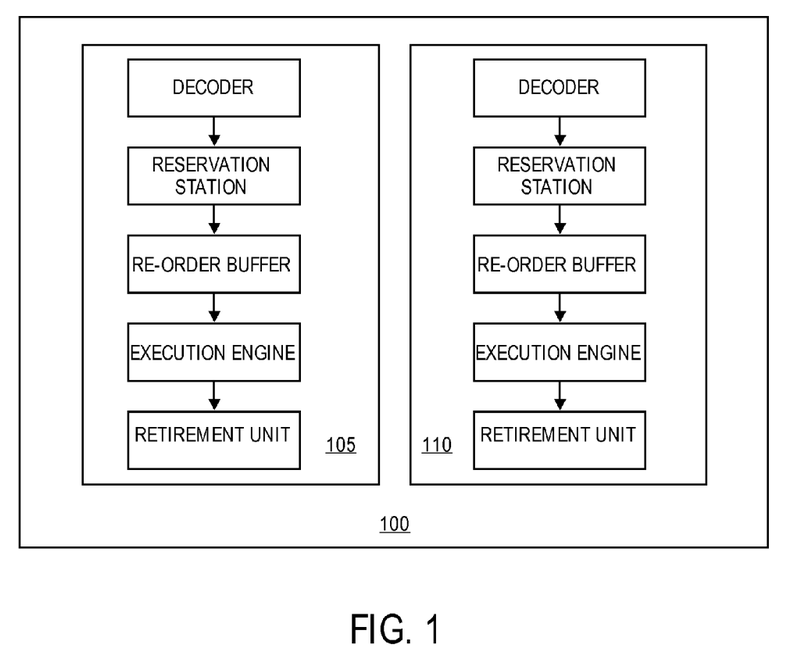
FIG. 1 illustrates a multi-core processor, in which at least one embodiment of the invention may be used.

FIG. 1 illustrates a multi-core processor, in which at least one embodiment of the invention may be used. Specifically, FIG. 1 illustrates a processor 100 having processing cores 105 and 110 integrated within the same die. In other embodiments, the cores may be on separate die or may be in separate processors. Furthermore, embodiments of the invention may also be applied to processors or systems having more than two cores or processors. The exact arrangement or configuration of the cores in FIG. 1 are not important to embodiments of the invention. In some embodiments, numerous cores may be arranged in other configurations, such as a ring. Located within each core of FIG. 1 is a power controller to control the power consumed by the respective core. In other embodiments, each core's power may be controlled by logic (software, hardware, or both) located elsewhere, including outside of the processor.

Illustrated within the cores of FIG. 1 are pipeline stages for processing instructions. In other embodiments, other logic may be found within the cores. In one embodiment, the cores are out-of-order execution cores, whereas in other embodiments, they may process instructions in-order. Furthermore, in other embodiments, the cores may be of different types with different logic located within.

Figure 2:
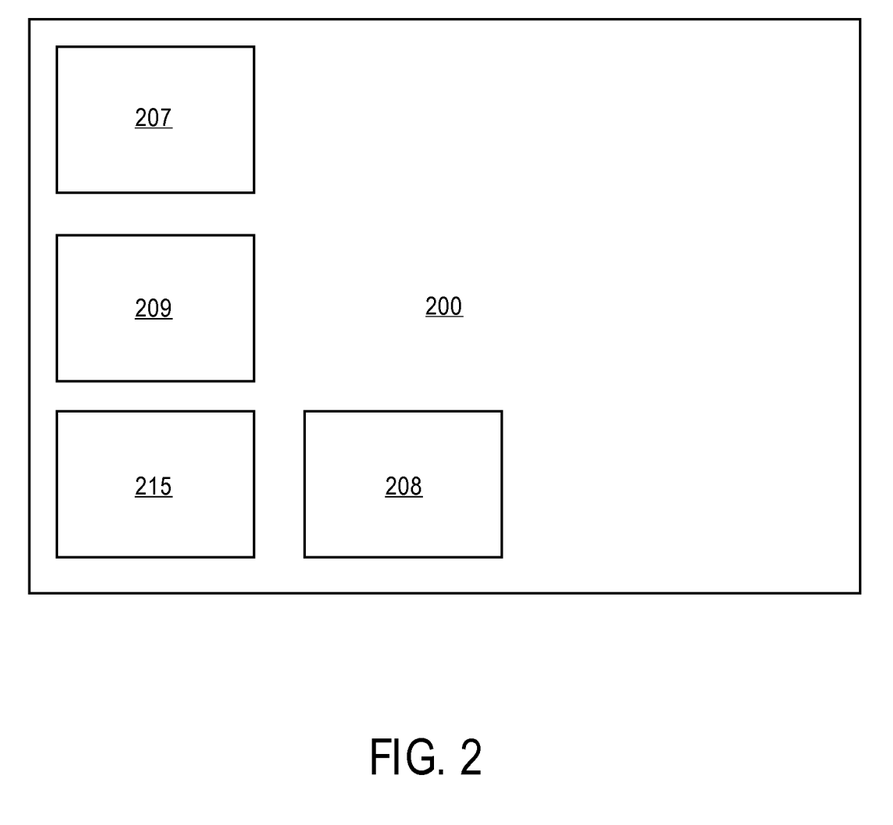
FIG. 2 illustrates a processor core and uncore logic in which one embodiment of the invention may be used.

FIG. 2 illustrates a processor core, in which at least one embodiment may be used. The processor core 200 illustrated in FIG. 1 may include one or more output circuits 207 to drive data onto one or more buses connected to either or both cores, such that data can be delivered to other circuits, devices, or logic within the processor or outside of the processor. Also located within, or otherwise associated with, each processor core of FIG. 1 is one or more power circuits 208 to reduce or increase the operating voltage of one or more portions of the core, as well as one or more clock modification circuits 209, such as one or more PLLs, to modify one or more clock signal frequencies, phases, work cycles, etc. In one embodiment, the one or more power circuits may include a number of transistors to implement a voltage divide circuit. The power circuits may use other devices or circuits to reduce or increase power to the cores, including charge pumps, voltage transformer circuits, etc.

In one embodiment, the core of FIG. 2 may have its power consumption adjusted according to various power states through power control logic 215. In one embodiment, the power control logic can respond to activity levels of each core independently of one another to adjust the voltage and/or the clock(s) used by each core, without coordinating, or otherwise detecting, the power states of the other core(s). For example, in one embodiment, the power control logic may detect a change in the work load or activities, or receive a signal from a detection circuit to detect the change in work load or activity, of a corresponding core and adjust either the voltage (via the power circuits) or one or more clocks (via the clock modification circuits) or both to put the core into a power state that best matches the requirements of the activity level or load. Furthermore, in one embodiment, the control logic may change the voltage and/or clock(s) of the core(s) in response to a thermal change in the core(s), or a change in the amount of current being drawn by the core(s).

In one embodiment, for example, the power drawn by a core is reduced if the core is relatively idle for a period of time. In one embodiment, the power is reduced in the core by placing the core in a c3 state or some other power state. Furthermore, in one embodiment the core is placed into a new power state without first detecting the power state of another core in the processor or system, or otherwise coordinating the change of power state with another core. Advantageously, at least one embodiment may enable each core to respond to power conditions and requirements on the core independently of other cores, such that each core may adjust its power consumption without regard to the power states of other cores.

In addition to the core logic, other circuits may be included in the processor, such as "un-core" logic. The un-core logic may include circuits to perform other functions besides those performed by the core, such as memory interface functions, digital signal processing functions, graphics functions, etc. In one embodiment, the power consumed by the un-core logic may be controlled in a similar manner as described in regard to the one or more cores. Furthermore, in some embodiments, in which the core and un-core logic have different voltage and/or clocking requirements, the power consumed by the core and un-core logic may be controlled independently of each other, just as the power consumed by the cores may be controlled independently of each other.

Figure 3:
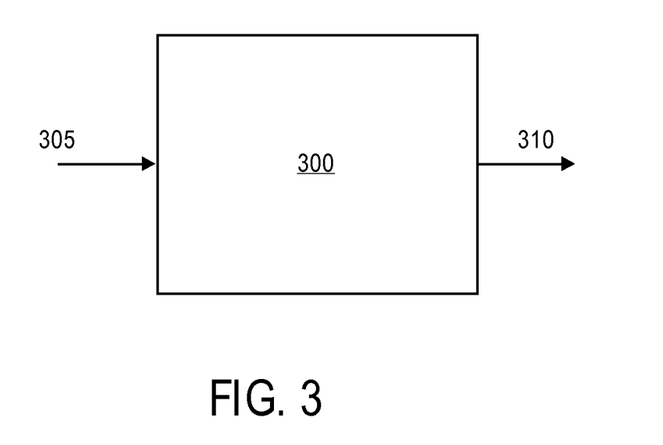
FIG. 3 illustrates power control logic according to one embodiment of the invention.

FIG. 3 illustrates power control logic, according to one embodiment, which may place a core or un-core logic, and corresponding outputs, into one of the power states illustrated in Table 1. The power control logic 300 includes at least one input 301 to detect at least one condition of a corresponding core or un-core logic. In one embodiment, the at least one condition may be a prescribed period of relative inactivity of the core or uncore, whereas in other embodiments, the condition may be a particular level of power consumption or thermal condition of the core or un-core logic. In other embodiments, other conditions or some combination of conditions may be detected by the power control logic or some other detection logic in order to indicate to the control logic whether to place the corresponding core or un-core logic into a different power state.

Power control logic 300 also includes an output 310 to control one or more PLLs responsible for delivering a clock signal to the corresponding core or un-core logic. Furthermore, the power control logic 300 may also include an output to control a voltage modification logic or circuit, such as one using one or more power transistors, voltage divider, or voltage transformation device. In other embodiments, the power control logic may include more inputs and/or more or fewer outputs. Furthermore, in one embodiment, the power control logic may be located within the same processor as the core it controls, whereas in other embodiments, it may be located outside of a processor containing a core it controls. In one embodiment, the power control logic may be implemented using hardware circuits, whereas in other embodiments, the power control logic may be implemented in software, or both hardware and software.

The power control logic may control the power of a core according to any number of logical operations, depending on the circumstances in which a core is to be power controlled. However, the power control logic may not require coordination with other control logic controlling the power of other cores, such that the power control logic may control the power of a core independently of the power state or power control of any other core or processing element. Advantageously, the power control logic may control the power consumption of a core (or number of cores) without detecting a power state of another core, or otherwise coordinating with other cores, such that power control of each core may be performed more efficiently than some prior art power control techniques.

Figure 4:
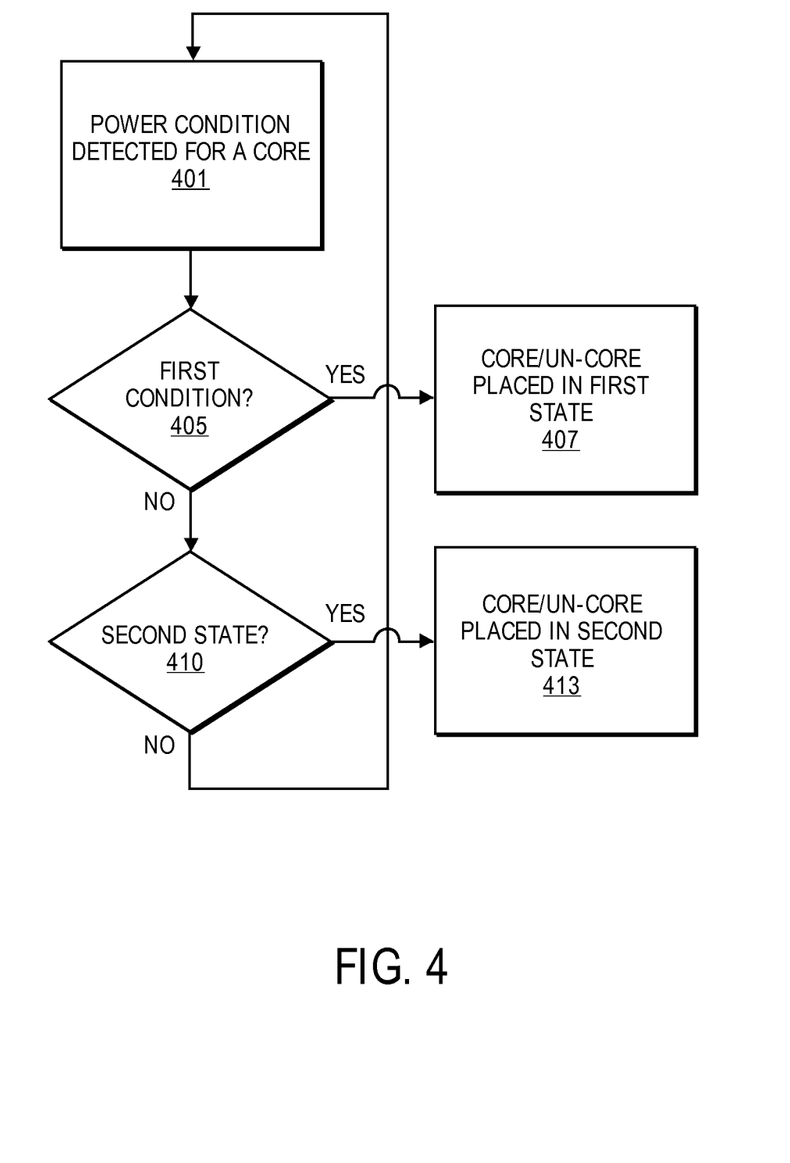
FIG. 4 is a flow diagram illustrating operations used in changing power states of at least one processing core according to one embodiment of the invention.

FIG. 4 is a flow diagram illustrating operations that may be performed according to one embodiment. For example, at operation 401, power control logic receives a signal to indicate some power-related condition of a core being power controlled by the power control logic. If the signal indicates a first condition at operation 405, the power control logic may place a core or un-core logic into a first power state at operation 407, such as an ACPI c3 state, whereas if a second condition is indicated by the signal at operation 410, the power control logic may place the core or un-core logic into a second power state at operation 413. In at least one embodiment, a number of cores may be power controlled according to at least the above operations independently of each other.

Figure 5:
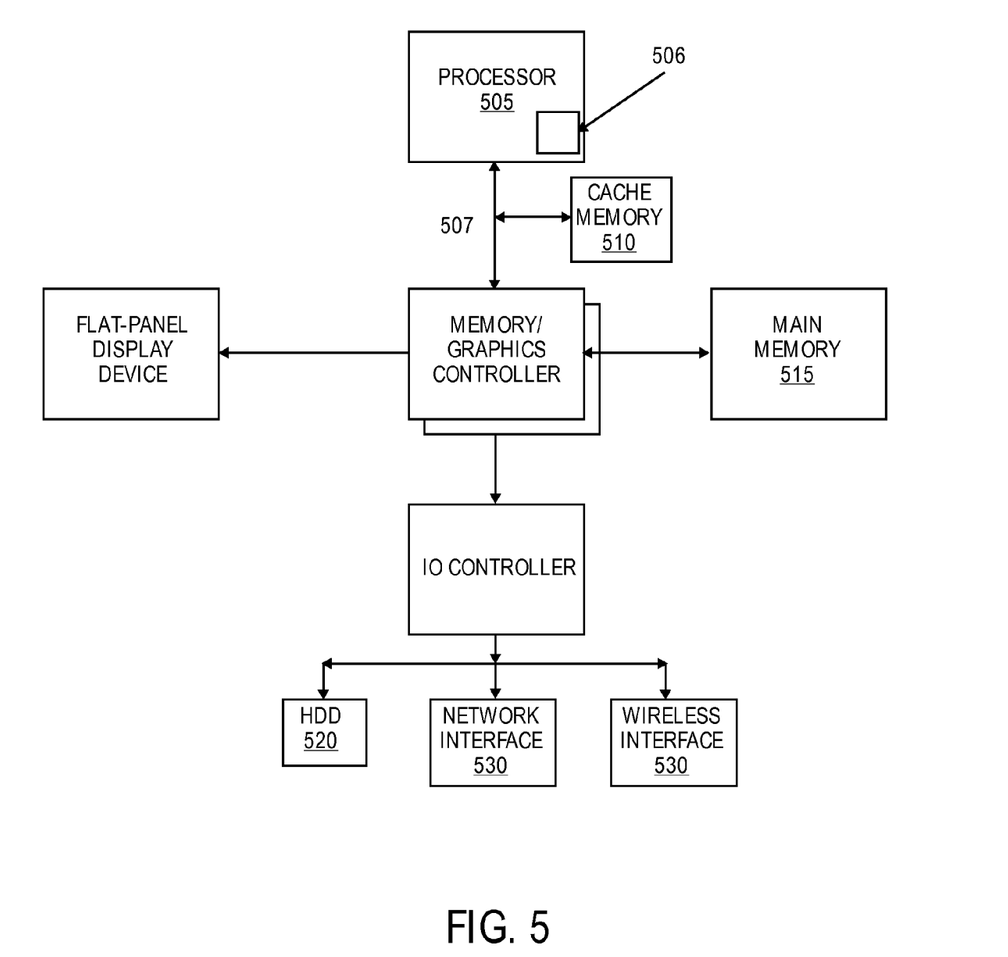
FIG. 5 illustrates a shared-bus computing system in which at least one embodiment of the invention may be used.

FIG. 5 illustrates a front-side-bus (FSB) computer system in which one embodiment of the invention may be used. A processor 505 accesses data from a level one (L1) cache memory 510 and main memory 515. In other embodiments of the invention, the cache memory may be a level two (L2) cache or other memory within a computer system memory hierarchy. Furthermore, in some embodiments, the computer system of FIG. 5 may contain both a L1 cache and an L2 cache.

The main memory may be implemented in various memory sources, such as dynamic random-access memory (DRAM), a hard disk drive (HDD) 520, or a memory source located remotely from the computer system via network interface 530 containing various storage devices and technologies. The cache memory may be located either within the processor or in close proximity to the processor, such as on the processor's local bus 507.

Figure 6:
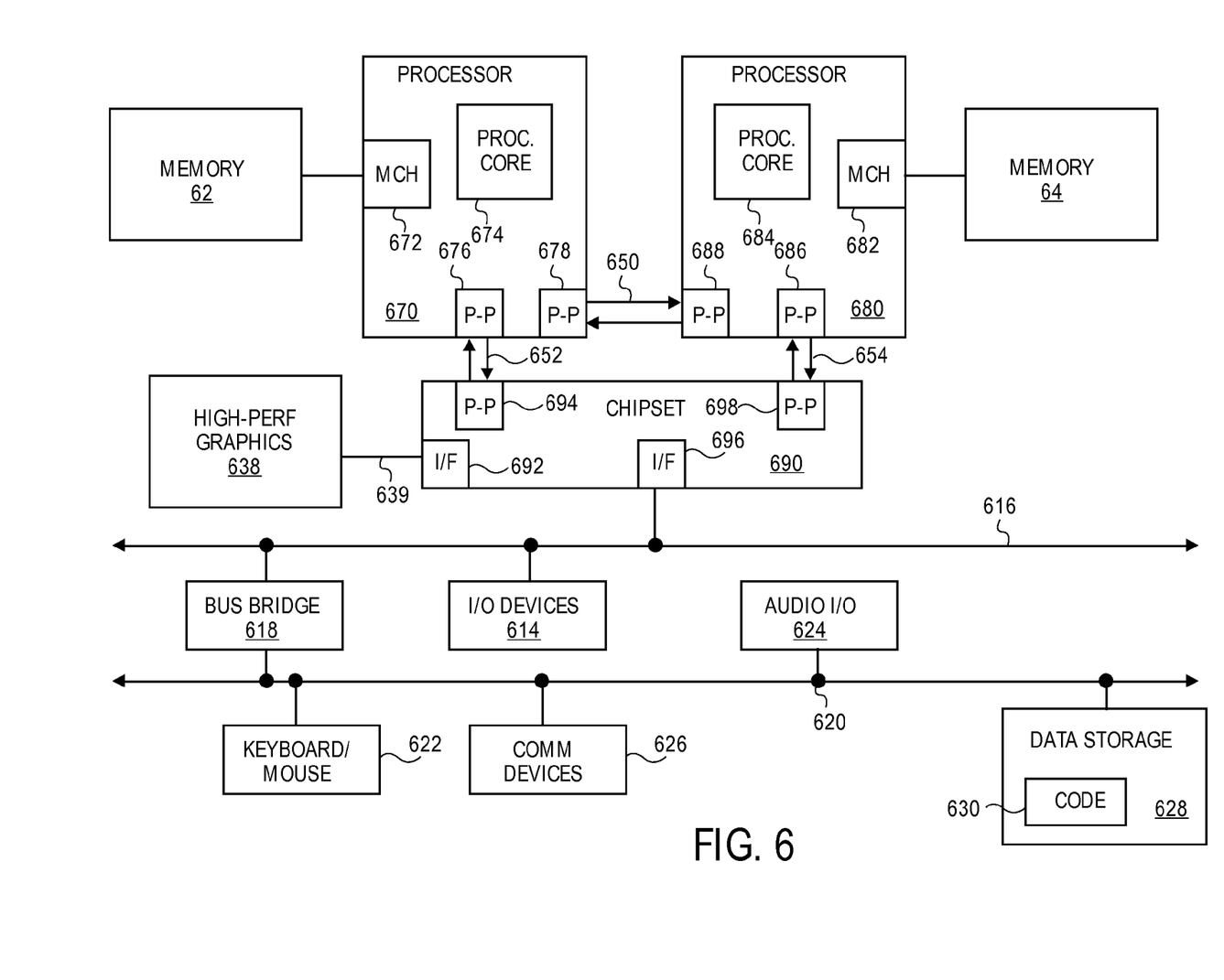
FIG. 6 illustrates a point-to-point computing system in which at least one embodiment of the invention may be used.

Furthermore, the cache memory may contain relatively fast memory cells, such as a six-transistor (6T) cell, or other memory cell of approximately equal or faster access speed. The computer system of FIG. 5 may be a point-to-point (PtP) network of bus agents, such as microprocessors, that communicate via bus signals dedicated to each agent on the PtP network. FIG. 6 illustrates a computer system that is arranged in a point-to-point (PtP) configuration. In particular, FIG. 6 shows a system where processors, memory, and input/output devices are interconnected by a number of point-to-point interfaces.

The system of FIG. 6 may also include several processors, of which only two, processors 670, 680 are shown for clarity. Processors 670, 680 may each include a local memory controller hub (MCH) 672, 682 to connect with memory 22, 24. Processors 670, 680 may exchange data via a point-to-point (PtP) interface 650 using PtP interface circuits 678, 688. Processors 670, 680 may each exchange data with a chipset 690 via individual PtP interfaces 652, 654 using point to point interface circuits 676, 694, 686, 698. Chipset 690 may also exchange data with a high-performance graphics circuit 638 via a high-performance graphics interface 639. Embodiments of the invention may be located within any processor having any number of processing cores, or within each of the PtP bus agents of FIG. 6.

Other embodiments of the invention, however, may exist in other circuits, logic units, or devices within the system of FIG. 6. Furthermore, in other embodiments of the invention may be distributed throughout several circuits, logic units, or devices illustrated in FIG. 6.

Processors referred to herein, or any other component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these mediums may "carry" or "indicate" the design, or other information used in an embodiment of the present invention, such as the instructions in an error recovery routine. When an electrical carrier wave indicating or carrying the information is transmitted, to the extent that copying, buffering, or re-transmission of the electrical signal is performed, a new copy is made. Thus, the actions of a communication provider or a network provider may be making copies of an article, e.g., a carrier wave, embodying techniques of the present invention.

Thus, techniques for steering memory accesses, such as loads or stores are disclosed. While certain embodiments have been described, and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

Various aspects of one or more embodiments of the invention may be described, discussed, or otherwise referred to in an advertisement for a processor or computer system in which one or more embodiments of the invention may be used. Such advertisements may include, but are not limited to news print, magazines, billboards, or other paper or otherwise tangible media. In particular, various aspects of one or more embodiments of the invention may be advertised on the internet via websites, "pop-up" advertisements, or other web-based media, whether or not a server hosting the program to generate the website or pop-up is located in the United States of America or its territories.

What is claimed is:

1. A processor comprising:
   a memory controller;
   two processing cores, wherein each of the two processing cores include at least a decoder and one or more out-of-order execution units;
   a level one (L1) and a level two (L2) cache; and
   first power control logic within or otherwise associated with a first of the two processing cores, and second power control logic within or otherwise associated with a second of the two processing cores, the first and second power control logic coupled to one or more voltage modification circuits and clock gating control circuits,
   wherein the one or more voltage modification circuits are to independently control a voltage of one of the processing cores of the processor based on a requirement of a load and a thermal condition of the processing core and without consideration of any operating conditions of the other processing core of the processor, wherein the voltage includes a minimal voltage applied to the one processing core while the one processing core is not operating at which the one processing core's state is preserved, and wherein the one or more clock gating control circuits are to cause one or more clocks to the processing cores to be independently gated.

2. The processor of claim 1, wherein the power control logic is to control the voltage supplied to the processing core based on the requirement of the load and the thermal condition of the processing core and without first detecting a power state of the other processing core of the processor.

3. The processor of claim 1, wherein the one or more voltage modification circuits include one or more power transistors or voltage transformers or charge pumps, wherein the power control logic is to control the one or more power transistors or voltage transformers or charge pumps to change the voltage supplied to the processing core.

4. The processor of claim 3, wherein the power control logic is to change the power state of the processing core from one power state to an other power state in response to the change in the voltage.

5. The processor of claim 4, wherein the one power state and the other power state includes a power state defined in advanced configuration and power interface (ACPI) standards.

6. The processor of claim 5, wherein the power control logic is to change the power state of the processing core to a C3 state in response to a decrease in a workload of the processing core.

7. The processor of claim 6, wherein the power control logic is to change the power state of the processing core to the C3 state if the processing core is idle for a prescribed period of time.

8. The processor of claim 7, wherein the power control logic is to detect a change in the workload before changing the voltage supplied to the processing core.

9. The processor of claim 8, wherein the power control logic is coupled to a detection logic, wherein the detection logic is to detect a change in the workload of the processing core.

10. The processor of claim 1, wherein the one or more clock modification circuits include one or phase-lock loop (PLL) circuits, wherein the power control logic is to control the one or more PLLs to independently gate the one or more clocks delivered to the processing core.

11. A method in a multi-core processor having a plurality of processing cores, the method comprising independently controlling a clock frequency and voltage supplied to a first processing core of the processor based on a workload and a thermal condition of the first processing core and without detecting a power state or other operating condition of a second processing core of the processor, wherein each of the plurality of cores include at least a decoder, a reorder buffer, an out-of-order execution unit, and a retirement unit and coupled to a cache memory including at least one of a level one (L1) and level two (L2) cache, wherein first power control logic within or otherwise associated with a first of the two processing cores, and second power control logic within or otherwise associated with a second of the two processing cores, controls the clock frequency and voltage supplied to the first and second processing cores, wherein the voltage supplied to the first processing core includes a minimal voltage applied to the first processing core while the processing core is not operating and at which the first processing core will retain its state.

12. The method of claim 11 comprising controlling one or more voltage and clock modification circuits to independently control the voltage and the clock frequency supplied to the first processing core, wherein the multi-core processor includes the one or more voltage and clock modification circuits.

13. The method of claim 11 comprising controlling one or more power transistors or voltage altering circuits to change the voltage supplied to the first processing core, wherein the one or more voltage modification circuits include the one or more power transistors or the voltage altering circuits.

14. The method of claim 11 comprising controlling one or more phase locked loop (PLL) circuits to change a clock frequency delivered to the first processing core, wherein the one or more clock modification circuits include the one or phase-lock loop (PLL) circuits.

15. The method of claim 14 comprising changing the first processing core from one power state to an other power state in response to the change in the voltage and the clock frequency.

16. The method of claim 15, wherein the one and the other power state represents a power state defined in advanced configuration and power interface (ACPI) standards.

17. The method of claim 16 comprising changing a power state of the first processing core to a C3 state in response to a decrease in the workload of the first processing core.

18. The method of claim 17 comprising changing a power state of the first processing core to the C3 state if the first processing core is idle for a prescribed period of time.

19. The method of claim 17 comprising detecting a change in the workload of the first processing core before changing the voltage and the clock frequency of the first processing core.

20. A non-transitory machine-readable storage medium having stored thereon program code that when processed by an integrated circuit causes the integrated circuit to perform a method, comprising:

independently controlling a clock frequency and voltage supplied to a processing core of the integrated circuit based on a workload and a thermal condition of the processing core and without reference to any operating conditions of other processing cores of the integrated circuit, wherein the integrated circuit includes a plurality of processing cores, wherein each of the plurality of processing cores include at least a decoder, a reorder buffer, an out-of-order execution unit, and a retirement unit and coupled to a cache memory including at least one of a level one (L1) and level two (L2) cache, wherein first power control logic within or otherwise associated with a first of the two processing cores, and second power control logic within or otherwise associated with a second of the two processing cores, controls the clock frequency and voltage supplied to the first and second processing cores, wherein the voltage supplied to the processing core includes a minimal voltage applied to the processing core while the processing core is not operating and at which the processing core will retain its state.

21. The non-transitory machine-readable storage medium of claim 20 wherein the method comprises controlling one or more voltage and clock modification circuits to independently control the voltage and the clock frequency supplied to the processing core, wherein the multi-core processor includes the one or more voltage and clock modification circuits.

22. The non-transitory machine-readable storage medium of claim 20 wherein the method comprises controlling one or more power transistors or voltage divider circuits to change the voltage supplied to the processing core, wherein the one or more voltage modification circuits include one or more power transistors or voltage divider circuits.

23. The non-transitory machine-readable storage medium of claim 20 wherein the method comprises controlling one or more phase locked loop (PLL) circuits to change the clock frequency delivered to the processing core, wherein the one or more clock modification circuits include the one or phase-lock loop (PLL) circuits.

24. The non-transitory machine-readable storage medium of claim 23 wherein the method comprises changing the processing core from one power state to an other power state in response to the change in the voltage and the clock frequency.

25. The non-transitory machine-readable storage medium of claim 24, wherein the one power state and the other power state represents a power state defined in advanced configuration and power interface (ACPI) standards.

26. The non-transitory machine-readable storage medium of claim 25 wherein the method comprises changing a power state of the processing core to a C3 state in response to a decrease in the workload of the processing core.

27. The non-transitory machine-readable storage medium of claim 26 wherein the method comprises changing a power state of the processing core to the C3 state if the processing core is idle for a prescribed period of time.

28. The non-transitory machine-readable storage medium of claim 26 wherein the method comprises detecting a change in the workload of the processing core before changing the voltage and the clock frequency of the processing core.

29. A non-transitory machine readable storage medium containing data describing a design of an integrated circuit, comprising:
    a memory controller;
    two processing cores, wherein each of the two processing cores include at least a decoder and one or more out-of-order execution units;
    a level one (L1) and a level two (L2) cache; and
    first power control logic within or otherwise associated with a first of the two processing cores, and second power control logic within or otherwise associated with a second of the two processing cores, the first and second power control logic coupled to one or more voltage modification circuits and clock gating control circuits,
    wherein the one or more voltage modification circuits are to independently control a voltage of one of the processing cores based on a requirement of a load and a thermal condition of the processing core and without consideration of any operating conditions of the other processing core, wherein the voltage supplied to the one processing core includes a minimal voltage applied to the one processing core while the one processing core is not operating and at which the one processing core will retain its state, and
    wherein the one or more clock gating control circuits are to cause one or more clocks to the processing core to be independently gated.

* * * * *